United States Patent [19]
Granger et al.

[11] 3,788,474
[45] Jan. 29, 1974

[54] APPARATUS FOR CONCENTRATING A LIQUID CONTAINING NON-ULTRAFILTRABLE ELEMENTS

[75] Inventors: Alain Granger, Lesigny; Andre Sausse, Sceaux, both of France

[73] Assignee: Rhone-Poulenc S.A., Paris, France

[22] Filed: Oct. 12, 1971

[21] Appl. No.: 188,137

[30] Foreign Application Priority Data
Oct. 12, 1970 France .............................. 70.36774

[52] U.S. Cl. ................................. 210/137, 210/321
[51] Int. Cl. ............................................ B01d 31/00
[58] Field of Search ..... 210/22, 23, 90, 94, 321, 96, 210/137

[56] References Cited
UNITED STATES PATENTS
3,305,097  2/1967  Hatelson ........................... 210/321
3,505,215  4/1970  Bray .................................. 210/22
3,483,867  12/1969 Markovitz ....................... 210/23 X
3,617,550  11/1971 Elata et al. ........................ 210/23
3,506,126  4/1970  Serfass et al. ................. 210/321 X
3,712,474  1/1973  Martinez .......................... 210/321

Primary Examiner—Frank A. Spear, Jr.
Attorney, Agent, or Firm—Stevens, Davis, Miller and Mosher

[57] ABSTRACT

Apparatus and process for the concentration of a liquid containing non-ultrafiltrable elements, e.g. ascitic fluid in which liquid is fed to an ultrafilter having a membrane therein, and the concentrate and ultrafiltrate are withdrawn from the ultrafilter in which a pressure drop is induced in the concentrate by an auxiliary hydraulic resistance causing a pressure drop in concentrate which is proportional to the pressure drop exerted on the ultrafiltrate by the membrane in the inverse ratio to the ratio of the flow rates of the concentrate and of the ultrafiltrate.

3 Claims, 1 Drawing Figure

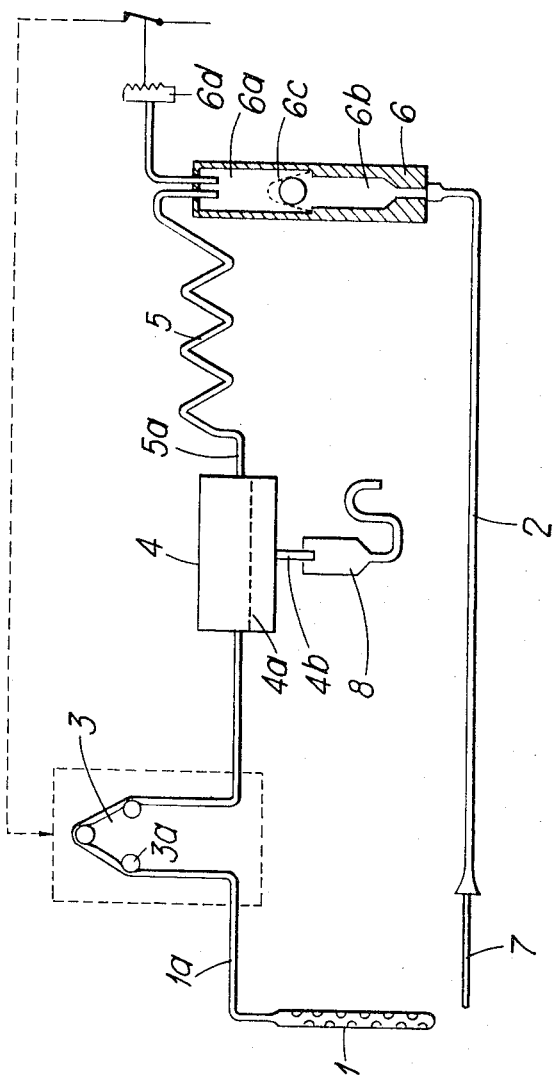

APPARATUS FOR CONCENTRATING A LIQUID CONTAINING NON-ULTRAFILTRABLE ELEMENTS

The present invention relates to an apparatus for concentrating a liquid, such as a biological liquid, containing non-ultrafiltrable elements. The apparatus according to the invention makes it possible, in particular, to treat serous effusions with discharge of water and ultrafiltrable elements without removal of protein, for example cirrhoses accompanied by effusion. For the sake of simplification, only this treatment will be referred to hereafter.

It is known that the ascitic fluid which results, inter alia, from portal hypertension, contains from 10 to 35 g/l of proteins, in particular of albumin.

In order to relieve these patients, it has been proposed to remove the ascitic fluid by puncture, The simple discharge of the liquid resulting from the puncture causes the patient a significant loss of autologous proteins and this gives rise to a deficiency which must be compensated.

It has therefore been proposed to re-inject the ascitic fluid into a vein, but this treatment is most unsatisfactory for the patient who thus does not lose his excess of water and of small molecules.

A.L. MEIER [Deutsch. Med. Wschr. (1970) 95 12–14] has proposed a surgical treatment which allows the liquid to be reabsorbed across the diaphragm. However, such a treatment is not always possible, for example because of the poor general condition of the patient.

According to the present invention there is provided apparatus for concentrating a liquid containing non-ultrafiltrable elements, such apparatus comprising a chamber, having a membrane therein preventing the passage of large molecules therethrough, the chamber including an inlet, a concentrate outlet and an ultrafiltrate outlet, means for producing a pressure differential across the membrane, and an auxiliary hydraulic resistance connected to said concentrate outlet, the value of which is between 0.1 and 10 times the value of said resistance to flow of ultrafiltrate through the membrane.

Such an apparatus avoids resorting to surgery and allows the excess fluid to be removed whilst retaining the autologuous proteins for the patient. The apparatus according to the invention makes it possible to concentrate the proteins of the ascitic fluid to a value close to the blood concentration, and the venous re-injection of this concentrate can readily be tolerated by the patient, contrary to what has been observed for the ascitic fluid itself.

This re-injection can be effected subsequently, but it is generally preferred to effect it continuously, directly following the concentration process.

The ultrafilter is equipped with a membrane which does not transmit albumin, of the type which is suitable for the treatment of re-injectable organic liquids, that is to say which is sterile, non-toxic and apyrogenic, and means which allow a pressure difference to be established between the two sides of the membrane. The pressure difference is not critical and a range of 0.2 to 1 atmosphere is generally suitable. Though a haemodialyser can give satisfaction, it is preferable to use an ultrafilter which withstands a higher pressure and produces a higher flow rate for a given membrane surface area. This membrane can be of any known type capable of retaining the proteins of lowest molecular weight and can, by way of example, consist of cellulosic membranes.

The ultrafiltration is brought about by a pressure difference between the two sides of the membrane. This pressure difference is not critical and a range of 0.20 to 1 bar is generally suitable. The pressure difference serves to overcome the resistance of the membrane to the passage of water and of the substances of low molecular weight dissolved therein. The pressure difference furthermore means that, where relevant, the possible osmotic pressure difference between the effused fluid and the ultrafiltrate is negligible.

As has been indicated above, it is important to return to the patient his autologous proteins contained in the effused fluid, at a concentration similar to that of the blood plasma, that is to say about 70 g/litre. It is hence necessary that the operator should keep the degree of concentration of the liquid treated, and which is to be re-injected, at a constant and fixed value, regardless of the flow rate resulting from the serous effusion. This flow rate varies with time, in accordance with the exhaustion of the effusion, and varies all the more as the pressure of the effused fluid itself varies over a period of time. Furthermore, it is not possible safely to withdraw the effusion with more than a slight and limited negative pressure, so as to avoid the risk of a vacuum oedema.

Maintaining a constant degree of concentration implies maintaining constant the ratio of two of the three flow rates which affect the ultrafilter (diluted liquid, concentrate and ultrafiltrate) regardless of the variations in the flow rate of the diluted liquid, the composition of which is constant.

As the ultrafiltration flow rate is proportional to the pressure difference established between the two sides of the membrane, it is also possible to control this pressure difference through any one of the three flow rates.

These various methods of control require the permanent measurement of a flow rate, its comparison with a different parameter, flow rate or pressure, and the control of at least one of the parameters compared, in order to achieve the desired ratio.

According to the invention, the flow rates ratio is controlled by a balancing resistance of any suitable design, for example a precision valve (with a needle valve or with a ribbed piston), a rigid capillary tube of variable length, or a flexible tube with adjustable flattening, positioned between the ultrafilter and reinjection device.

The balancing resistance is adjusted once and for all until the desired degre of concentration is obtained, this degree, thereafter, remains constant regardless of the flow rate of the liquid to be treated provided the other parameters remain constant. In effect, the venous pressure is practically constant and close to atmospheric pressure and the flow rates of concentrate and of ultrafiltrate are inversely proportional to the pressure drops which the ultrafiltrate undergoes as a result of the membrane and the concentrate undergoes as a result of the reinjection device, the safety devices and the "balancing resistance". In the case of concentration to 50 percent (of the initial volume), for example for ascitic fluid, the balancing resistance is set to a valve such that the loss in pressure suffered by the concentrate is close to the loss in pressure caused by the membrane.

The advantages of this device should be clear. No constant measuring during operation and no complex control circuit are necessary and sterilisation, and retention of sterility, are facilitated through the absence of pressure- or flow-meauring devices. Simple visual control of the flow rates suffices, by means of, for example, a "drip" on each branch of the outlet from the ultrafilter, supplemented, if necessary, by periodically checking the volume of ultrafiltrate by means of a graduated vessel.

The presence of a particle filter on the re-injection branch is frequently necessary because of the risk of coagulate (especially of fibrin) appearing; this can form either at the ultrafiltration membrane or even in the effusion. The type of filter is not critical; it can, for example, be a sintered glass plate or a fine-mesh sterilisable fabric. Equally, it is useful to connect a device for removing gas bubbles to the filter.

The liquid can be withdrawn by means of a probe, preferably a rounded probe with multiple lateral perforations, which restricts the danger of lesions of the organs during voluntary or involuntary movements by the patient.

The re-injection device can be a needle or a catheter. It is also possible to employ a permanent appliance, either for the sampling or for the re-injection.

The pump is preferably a non-volumetric pump such as a peristaltic pump having its flow rate sensitive both to the pressure drop on the input side and the excess pressure on the compression side, so as to avoid, on the one hand, the danger of suction and on the other hand the dangers of ruptures of the membrane or of the pipeline if a circuit should accidentally be obstructed.

The invention also provides a process for the concentration of a liquid containing non-ultrafiltrable elements, comprising the steps of feeding the liquid to an ultrafilter having a membrane therein, withdrawing concentrate and ultrafiltrate from the ultrafilter whereby a pressure drop is exerted on the ultrafiltrate by the membrane, and causing a pressure drop in concentrate which is proportional to the pressure drop exerted on the ultrafiltrate by the membrane in the inverse ratio to the ratio of the flow rates of the concentrate and of the ultrafiltrate.

In order that the invention may more readily be understood, the following description is given, merely by way of example, reference being made to the accompanying drawing, in which the sole FIGURE is a schematic view of one emboidment of apparatus for the treatment of a cirrhotic patient with ascites.

In the drawing, a peritoneal probe 1 is connected by means of a tube 1a to a peristaltic pump 3 having a rotor (not shown) carrying three pegs 3a, the pump eing one of the type having no stator. The tube forming the pump is constructed of medical quality silicon elastomer having a Shore hardness of 55 and an internal diameter of 3.99 and an external diameter of 5.01 millimetres. In the pump, the tube is subjected to a maximum tension of 300 grams. The maximum flow rate of the pump, when the intake height and compression height were nil, was 20 cm$^3$/minute. This flow rate becomes zero for an upstream pressure loss of one metre of water or a downstream pressure of 500 mm Hg. The axis of rotation of the pump was located 20 cm above the average level of the patient. The pump feeds an ultrafilter 4 of which the membrane is formed of regenerated cellulose having a surface of 0.8 m$^2$, and a thickness of 11 to 15 $\mu$ when dry. The permeability was 1.2 cm$^3$ per hour per mm Hg/m$^2$, and the pressure drop at 300 cm$^3$ per hour was 250 mm Hg. A capillary glass tube 5 having a length of 200 mm and an internal diameter of 0.5 millimetres was connected to a concentrate outlet 5a of the ultrafilter 4. On the other side of the membrane 4a the chamber of the ultrafilter 4 is provided with an ultrafiltrate outlet 4b which is connected to a bulb 8 for the visual control of the flow rate of the ultrafiltrate, which feeds a graduated vessel by gravity.

The end of the tube 5 remote from the ultrafilter 4 is connected to a safety device 6 comprising a bulb 6a for visual control of the flow rate of the concentrate, a bubbler trap 6b with a floating valve, a particle filter 6c of 50 mesh size polyester fabric, and a manometric contact 6d which stops the pump 3 when an excess pressure is caused by the bubbler trap 6b closing, if air should flow in. A tube 2 of medical quality silicon elastomer having a Shore hardness of 55 and an internal diameter of two millimetres and external diameter of 3.9 millimetres is connected to the outlet of the safety device 6 and is connected to an intravenous re-injection catheter 7 having a length of 100 millimetres and an internal diameter of one millimetre.

Using this apparatus on a patient, it was possible to withdraw, within four days, 23.5 kg of water and small molecules from the patient whilst continuously restoring to him the proteins from his ascitic fluid.

It will be clear that the combination of an ultrafilter and a balancing resistance on the concentrate outlet makes it possible to treat with ease various liquids which are sensitive to heat, to freezing or to centrifuging so as to fraction them into a proportion which is rich in non-ultrafiltrable elements and a portion which is devoid of these elements.

We claim:
1. Apparatus for concentrating a serous effusion said apparatus comprising in combination:
   a. a chamber;
   b. a membrane within the said chamber separating said chamber into first and second compartments and preventing the passage of large molecules therethrough;
   c. an inlet to said first compartment;
   d. a concentrate outlet from said first compartment and an ultrafiltrate outlet from the second compartment;
   e. a device for withdrawing fluid from a patient;
   f. a particle filter and a bubble trap connected to the concentrate outlet;
   g. a means for reinjection of concentrate into the living creature;
   h. a pump with reduced intake suction interconnecting the fluid withdrawing device and the inlet to said chamber, for producing a pressure differential across the membrane in response to the resistance presented by the membrane to flow of ultrafiltrate therethrough;
   i. a hydraulic resistance connected between said concentrate outlet and said particle filter and bubble trap; and
   j. mechanical means to support the membrane in order to allow desired transmembrane pressure.

2. Apparatus as claimed in claim 1, wherein the auxiliary hydraulic resistance is variable.

3. Apparatus as claimed in claim 1, wherein said pump is a statorless peristaltic pump.

* * * * *